May 19, 1964   J. W. AGER, JR., ETAL   3,133,970
DICARBORANYL ALKENES AND METHOD FOR THEIR PREPARATION
Filed Dec. 29, 1960
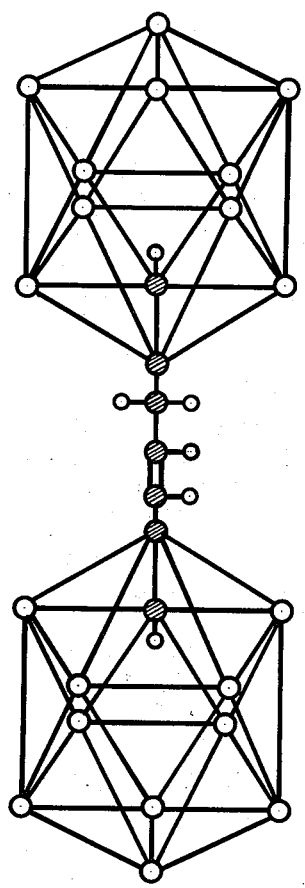
O BORON
⊘ CARBON
o HYDROGEN ON CARBON
  (HYDROGEN ATOMS ON BORON
  OMITTED FOR CLARITY)
FORMULA - A
INVENTORS:
JOHN W. AGER JR.
THEODORE L. HEYING
BY
*Walter D. Hunter*
AGENT

United States Patent Office 3,133,970
Patented May 19, 1964

3,133,970
DICARBORANYL ALKENES AND METHOD
FOR THEIR PREPARATION
John W. Ager, Jr., Princeton, N.J., and Theodore L.
Heying, North Haven, Conn., assignors to Olin
Mathieson Chemical Corporation, a corporation of
Virginia
Filed Dec. 29, 1960, Ser. No. 79,947
5 Claims. (Cl. 260—606.5)

This invention relates to novel organoboron compounds and, in particular it relates to the preparation of dicarboranyl alkenes. The dicarboranyl alkenes of this invention are prepared by the pyrolysis of a dicarboranyl alkyl ester of an aliphatic carboxylic acid.

The novel dicarboranyl alkenes of this invention are prepared by pyrolyzing a dicarboranyl alkyl ester of the class:

$$R_2COO[CHCR_1CHC(B_{10}H_8RR')_2]$$

wherein $R_1$ is a trivalent hydrocarbon radical containing 2 to 6 carbon atoms, wherein $R_2$ is an alkyl radical containing 1 to 5 carbon atoms, and wherein R and R' are each selected from the class consisting of hydrogen or an alkyl radical containing 1 to 5 carbon atoms.

Dicarboranyl alkyl esters of the above class can be prepared according to the method described in John W. Ager, Jr. et al. application Serial No. 79,948, filed December 29, 1960, and entitled Composition and Process. In general, these compounds are prepared by the reaction of a dicarboranyl alcohol with the anhydride of aliphatic carboxylic acid in an inert solvent and in the presence of an esterification catalyst. After removal of the solvent, water is added to the residue and the mixture extracted with ether. The ether fraction is washed with a sodium bicarbonate solution, dried, and then distilled. In the final step the desired product is obtained from the residue on re-crystallization from a heptane-toluene mixture. For example, the compound 1,3-dicarboranylpropyl-2-acetate $(B_{10}H_{10}CHCCH_2CH(OOCCH_3)CH_2CHCB_{10}H_{10})$ can be prepared by reacting 1,3-dicarboranyl propanol-2 $(B_{10}H_{10}CHCCH_2CHOHCH_2CHCB_{10}H_{10})$ with acetic anhydride in ethyl acetate and in the presence of perchloric acid. Dicarboranyl alcohols useful as starting materials in the preparation of the dicarboranyl alkyl esters can be prepared by a Grignard reaction as described in John W. Ager, Jr. et al. application Serial No. 79,948, filed December 29, 1960. In the first step a haloalkyl carborane is reacted with magnesium in dry ether to form the Grignard reagent and in the second step a solution of an alkyl formate in dry ether is reacted with the previously prepared Grignard reaction to yield a dicarboranyl alcohol. By this process the compound 1,3-dicarboranyl propanol-2 $(B_{10}H_{10}CHCCH_2CHOHCH_2CHCB_{10}H_{10})$ can be made by first reacting bromomethylcarborane $(B_{10}H_{10}CHCCH_2Br)$ in dry ether with magnesium to form the Grignard reagent and then in a second step the desired compound is formed by reacting a solution of ethyl formate in dry ether with the Grignard reagent.

The novel process of this invention proceeds according to the following equation in which, by way of illustration, the compound being pyrolyzed is $B_{10}H_{10}CHCCH_2CH(OOCCH_3)CH_2CHCB_{10}H_{10}$:

$B_{10}H_{10}CHCCH_2CH(OOCCH_3)CH_2CHCB_{10}H_{10} \xrightarrow{\Delta}$
$B_{10}H_{10}CHCCH_2CHCHCHCB_{10}H_{10} + CH_3COOH$ In general the pyrolysis is carried out by heating the dicarboranyl alkyl ester at a temperature of from about 350° C. to about 650° C. with the preferred temperature being from about 475° C. to about 575° C. It has been found convenient to introduce the ester into the heating zone of the pyrolysis apparatus in the form of a solution of the ester in an inert organic solvent. Suitable solvents include the lower alkyl esters of the aliphatic monocarboxylic acids. In addition, mixtures comprising a lower alkyl ester of an aliphatic monocarboxylic acid and an aliphatic monocarboxylic acid are also suitable as solvents. Lower alkyl esters of the aliphatic monocarboxylic acids which can be employed include those in which the alkyl group contains from 1 to 5 carbon atoms, for example, methyl acetate, ethyl acetate, ethyl propionate, methyl tert.-butyrate, propyl-n-butyrate, amyl acetate and amyl propionate while suitable aliphatic monocarboxylic acids include acetic, propionic, n-butyric, iso-butyric, valeric, etc.

Dicarboranyl alkyl esters useful as starting materials in the process of this invention include 1,2-dicarboranylethyl-acetate $(B_{10}H_{10}CHCCH(OOCCH_3)CH_2CHCB_{10}H_{10})$, 1,3-dicarboranylpropyl-2-acetate $(B_{10}H_{10}CHCCH_2CH(OOCCH_3)CH_2CHCB_{10}H_{10})$, 1,3-dicarboranylpropyl-2-propionate $(B_{10}H_{10}CHCCH_2CH(OOCCH_2CH_3)CH_2CHCB_{10}H_{10})$, 1,4-dicarboranylbutyl-1-acetate $(B_{10}H_{10}CHCCH(OOCCH_3)CH_2CH_2CH_2CHCB_{10}H_{10})$, 1,5-dimethylcarboranylamyl-2-butyrate $(CH_3B_{10}H_9CHCCH_2CH(OOCCH_2CH_3)$
$CH_2CH_2CH_2CHCB_{10}H_9CH_3)$ The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The process of this invention is illustrated by the following examples. In the examples the term "moles" signifies gram moles.

*Example 1*

A solution of 53 grams (0.0139 mole) of 1,3-dicarboranylpropyl-2-acetate in 125 ml. of ethyl acetate was charged to a dropping funnel which was attached to the top of a vertically mounted glass tube 30 inches in length with an outside diameter of 28 mm. The system was swept with nitrogen and the tube which was filled with glass helices was heated to 550° C. by means of a muffle furnace. From the dropping funnel the solution was added slowly to the glass tube. After 40 minutes when about one-half of the solution had been added, the tube became plugged just below the furnace exit and the reaction was terminated. The plug was removed by washing the column at room temperature with about 100 ml. of ether. Then the column was heated to the original temperature and the experiment was continued for an additional 40 minutes during which time the remainder of the 1,3-dicarboranylpropyl-2-acetate was passed through the heated tube. The column was allowed to cool to room temperature and washed with 200 ml. of ether. In the next step the ether solution was combined with that obtained from the first washing, and the combined washings extracted three times with 100 ml. portions of water, then three times with 100 ml. portions of a 10 percent sodium bicarbonate solution and finally the resulting either solution was dried over magnesium sulfate for 18 hours at room temperature. After filtering, the ether was removed at reduced pressure and there remained an off-white solid. Recrystallization of this solid from boiling heptane gave 27.5 grams (61 percent of the theoretical quantity) of 1,3-dicarboranyl propene $(B_{10}H_{10}CHCCH_2CHCHCHCB_{10}H_{10})$ a white crystalline product. The product was analyzed for boron and found to contain 65.8, 66.3, 65.3, 65.8 percent as compared to a theoretical value of 66.3 percent.

*Example II*

In this experiment a vertically mounted glass tube, 28 mm. O.D. and 15 inches in length, which was filled with glass helices and which was equipped with an internal thermocouple, served as reactor. After the reactor had been heated to a temperature of 500° C. a solution of 2.5 grams (0.0068 mole) of 1,3-dicarboranylpropyl-2-acetate in a mixture of 20 ml. of ethyl acetate and 30 ml. of acetic acid was dropped slowly through the tube. The product which collected at the bottom of the tube was dissolved in 30 ml. of methanol and to this solution there was added 5 gms. of concentrated potassium hydroxide. After the mixture had been allowed to stand for one hour, it was poured into 100 ml. of water and extracted with 100 ml. of ether. The ether solution was dried over magnesium sulfate at room temperature for two hours and then the ether was distilled off at atmospheric pressure. In the next step the residue was extracted once with 50 ml. carbon disulfide, and the extract separated from the remaining material by filtration. The carbon disulfide extract was evaporated on a steam bath and from the residue there was obtained by crystallization from a 1:1 heptane-toluene mixture 0.3 gram of 1,3-dicarboranyl propene (18 percent of the theoretical yield) which exhibited a melting point above 300° C. The structural formula of the compound $B_{10}H_{10}CHCCH_2CHCHCHCB_{10}H_{10}$ prepared as described in Examples I and II is shown as Formula A in FIGURE 1.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For futher information concerning the formulation of solid propellant compositions, reference is made to U.S. Patent 2,622,277 to Bonnell and to U.S. Patent 2,646,596 to Thomas.

What is claimed is:

1. A process for the preparation of an organoboron compound of the formula:

$(RR'B_{10}H_8CHC)_2R_3$ wherein R and R' are each selected from the class consisting of hydrogen and an alkyl radical having from 1 to 5 carbon atoms and $R_3$ is a bivalent monoalkenyl hydrocarbon radical having 2 to 6 carbon atoms which comprises pyrolyzing a material of the formula:

$R_2COO(RR'B_{10}H_8CHC)_2R_1$ wherein R and R' are each selected from the class consisting of hydrogen and an alkyl radical having 1 to 5 carbon atoms, $R_1$ is a trivalent acyclic hydrocarbon radical containing 2 to 6 carbon atoms and $R_2$ is an alkyl radical having 1 to 5 carbon atoms.

2. The method of claim 1 wherein the said material is $B_{10}H_{10}CHCCH_2CH(OOCCH_3)CH_2CHCB_{10}H_{10}$ 3. The process of claim 1 wherein the pyrolysis reaction is carried out in the presence of an inert organic solvent.

4. $(RR'B_{10}H_8CHC)_2R_3$, wherein R and R' are each selected from the class consisting of hydrogen and an alkyl radical having from 1 to 5 carbon atoms and $R_3$ is a bivalent monoalkenyl hydrocarbon radical having 2 to 6 carbon atoms.

5. $B_{10}H_{10}CHCCH_2CHCHCHCB_{10}H_{10}$.

No references cited.